United States Patent
Hierro Domenech et al.

(10) Patent No.: US 10,642,023 B2
(45) Date of Patent: May 5, 2020

(54) FILTERING SYSTEM FOR ELECTROMAGNETIC RADIATIONS

(71) Applicant: HEWLETT-PACKARD DEVELOPMENT COMPANY, L.P., Houston, TX (US)

(72) Inventors: Lluis Hierro Domenech, Sant Llorenc d'Hortons (ES); Esteve Comas, Sant Quirze del Valles (ES); Sergi Culubret, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 74 days.

(21) Appl. No.: 15/567,046

(22) PCT Filed: Sep. 25, 2015

(86) PCT No.: PCT/EP2015/072101
§ 371 (c)(1),
(2) Date: Oct. 16, 2017

(87) PCT Pub. No.: WO2017/050388
PCT Pub. Date: Mar. 30, 2017

(65) Prior Publication Data
US 2018/0203224 A1    Jul. 19, 2018

(51) Int. Cl.
*G02B 26/02*    (2006.01)
*G02B 26/00*    (2006.01)
(Continued)

(52) U.S. Cl.
CPC .......... *G02B 26/004* (2013.01); *B29C 64/165* (2017.08); *B29C 64/286* (2017.08);
(Continued)

(58) Field of Classification Search
CPC . G02B 5/204; G02B 5/22; G02B 5/24; G02B 26/004; G02B 5/208; G05D 25/02;
(Continued)

(56) References Cited

U.S. PATENT DOCUMENTS 2,707,235 A    4/1955   Townes
4,292,526 A    9/1981   Marling
(Continued)

FOREIGN PATENT DOCUMENTS

WO    WO 02/14926    2/2002

OTHER PUBLICATIONS

Sebacher, D.I.; "A Gas Filter Correlation Monitor for Co, Ch4, and HCL"; Dec. 1977; http://ntrs.gov/archive/nasa/casi.ntrs.nasa.gov/19780005465.pdf.

*Primary Examiner* — Euncha P Cherry
(74) *Attorney, Agent, or Firm* — Fabian VanCott

(57) ABSTRACT

An electromagnetic filtering system comprising an electromagnetic radiation source, a filter chamber to filter the radiation and a filter chamber control system to selectively modify the contents of the filter chamber in order to modify the wavelengths of the radiation that pass through the filter chamber. There is also provided a method of controlling an electromagnetic filtering system that comprises a controllable filter chamber capable of being controlled so as to selectively be filled with a filter material, the method comprising —determining filtering characteristics to be provided by the filtering system, —determining whether the filter chamber should be filled with the filter material, and —controlling the filter chamber to be filled as determined.

20 Claims, 4 Drawing Sheets

(51) Int. Cl.
*G02B 5/24* (2006.01)
*G01J 3/10* (2006.01)
*B33Y 30/00* (2015.01)
*B29C 64/286* (2017.01)
*B29C 64/165* (2017.01)
*G02B 5/20* (2006.01)
*B33Y 70/00* (2020.01)

(52) U.S. Cl.
CPC ............... *B33Y 30/00* (2014.12); *G01J 3/10* (2013.01); *G01J 3/108* (2013.01); *G02B 5/208* (2013.01); *G02B 5/24* (2013.01); *B29K 2995/002* (2013.01); *B33Y 70/00* (2014.12)

(58) Field of Classification Search
CPC . G03F 7/70191; G03F 7/70575; B33Y 30/00; B33Y 70/00; B29C 64/286; B29C 64/165; G01J 3/10; G01J 3/108; B29K 2995/002
USPC ......................................................... 359/228
See application file for complete search history.

(56) References Cited

U.S. PATENT DOCUMENTS

| | | |
|---|---|---|
| 4,829,597 A | 5/1989 | Gelbwachs |
| 7,027,683 B2 * | 4/2006 | O'Connor ............... G02B 5/24 385/16 |
| 7,969,576 B1 | 6/2011 | Buckley et al. |
| 8,014,071 B2 | 9/2011 | Matsumoto et al. |
| 8,736,845 B2 | 5/2014 | Wu et al. |
| 2005/0068629 A1 | 3/2005 | Fernando |
| 2010/0149483 A1 | 6/2010 | Chiavetta |

* cited by examiner

FILTERING SYSTEM FOR ELECTROMAGNETIC RADIATIONS

BACKGROUND

Many systems and processes use portions of the electromagnetic spectrum. For example, ultra-violet radiation may be used to cure or harden materials comprising photo polymers, such as adhesives, printing fluids, or the like. Other systems, for example, may use infrared radiation to heat a target.

The efficiency of such processes may be directly influenced by the emission spectrum of an electromagnetic radiation source and the absorption spectrum of the intended target.

BRIEF DESCRIPTION

Examples will now be described, by way of non-limiting example only, with reference to the accompanying drawings, in which.

DETAILED DESCRIPTION

The closer the match between the emission spectrum of an electromagnetic radiation source and the absorption spectrum of a target material the higher the efficiency of the process will be. Since the absorption spectrum of a material is highly dependent on the chemical makeup of the material, system designers typically aim to choose a radiation source having an emission spectrum that is best suited to the absorption spectrum of the material to be processed.

However, in many cases the radiation spectra of commercially available electromagnetic radiation sources may not be suitably matched to the absorption spectrum of a material to be processed. In other systems where multiple materials are to be processed there may be no suitably matched radiation sources that are matched to each of the multiple materials to be processed.

Figure 1:
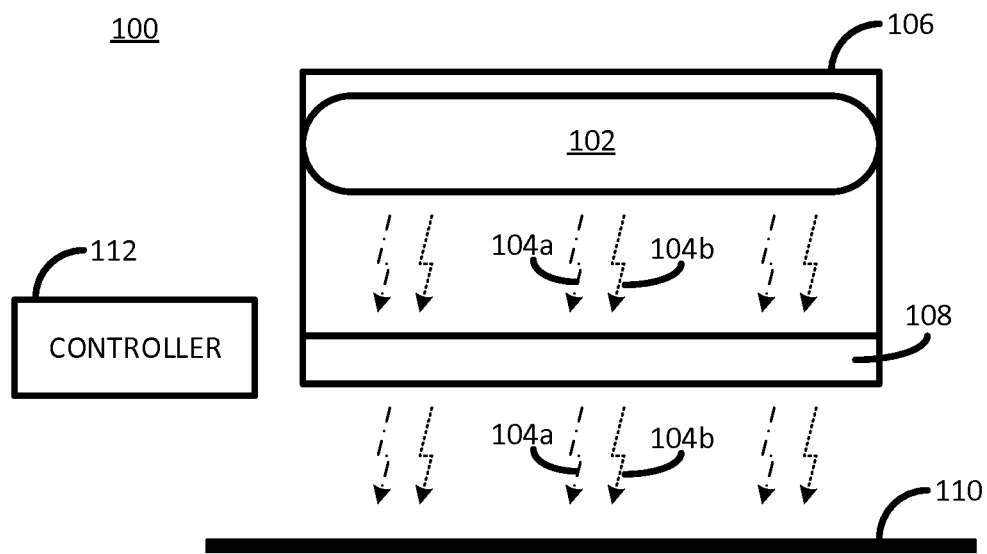
FIG. 1 is an illustration of a filtering system according to one example.

Referring to FIG. 1 there is a shown a block diagram of an electromagnetic radiation filtering system 100. The system 100 comprises an electromagnetic radiation source 102, such as an infrared lamp. Hereinafter, reference will be made to infrared lamps, although it will be understood that this is no way limiting, and in other examples other kinds of electromagnetic radiation sources, such as ultra-violet lamps, visible light sources, and the like may be used as appropriate. The lamp 102 emits light having a given radiation spectrum. As illustrated in FIG. 1, the lamp 102 emits radiation having a first range of wavelengths 104a, and a second range of wavelengths 104b. For simplicity the example shown in FIG. 1 shows two ranges of wavelengths 104, although in a real example multiple ranges of wavelengths may be present.

The lamp 102 is contained within a housing 106. In one example the housing 106 is opaque to light emitted from the lamp 102. At the base of the housing 106 is a transparent filter chamber 108. By transparent is meant transparent to at least a portion of the spectrum of radiation emitted by the lamp 102. In one example the filter chamber may be made from glass or quartz, although other materials may also be suitable. As illustrated in FIG. 1, since the filter chamber 108 is transparent, the radiation emitted from the lamp 102 passes through the filter chamber 108 and reaches a target zone 110. The target zone 110 may, for example, comprise a material, that is to be processed by the radiation emitted by the lamp 102.

Figure 2:
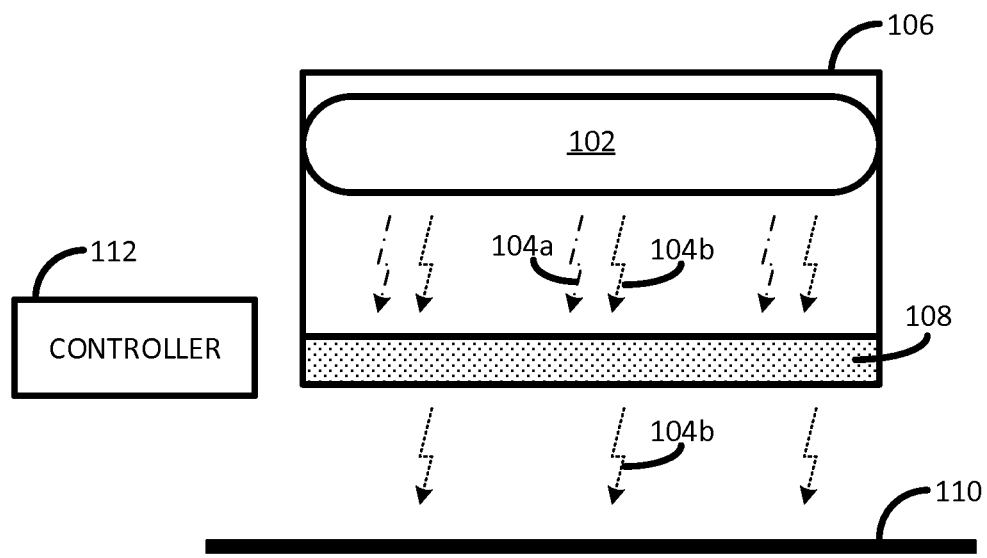
FIG. 2 is an illustration of a filtering system according to one example.

The system 100 further comprises a controller 112 to selectively modify the contents of the filter chamber 108. In one example, the controller 112 may selectively control the filter chamber 108 to be filled, or emptied with a filter material, such as a suitable gas or fluid. The filter material may have specific filtering properties designed to prevent, or at least reduce, the amount of radiation of specific wavelengths from reaching the target zone 110. This is illustrated in FIG. 2, in which the filter chamber 108 has been filled with a filter material that prevents, or at least substantially reduces, radiation having a first range of wavelengths 104a from reaching the target zone 110. In one example the filter material may be a gas. In another example the filter material may be a liquid.

Figure 3:
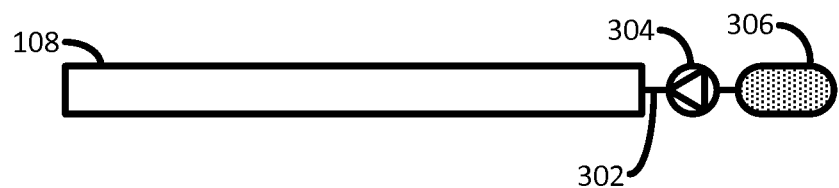
FIG. 3 is an illustration of a controllable filter chamber according to one example.

An example of a controllable filter chamber 108 is shown in FIG. 3. In this example the filter chamber 108 is a sealed chamber that is in fluid communication, through a conduit 302, with a pump 304. The pump 304 may be controlled to pump a filter material, such as a gas, from a fluid store 306 to the interior of the filter chamber 108. The pump 304 may also be controlled to remove filter material from the filter chamber 108 by pumping the filter material in the filter chamber 108 back to the fluid store 306. The pump 304 may be controlled, for example, in response to a control signal sent by the controller 112. In one example the pump 304 may be chosen to enable the filter chamber 108 to be filled or emptied in a short time, such as less than 1 second, less than 5 seconds, and less than 10 seconds.

In this example, when the pump 304 is controlled to pump a filter material into the fluid store 306 this leaves the filter chamber 108 devoid, or substantially devoid, of the filter material. For example, this may leave a full or partial vacuum in the filter chamber 108. In this way, when the filter chamber 108 is empty it may be substantially transparent to electromagnetic radiation, and when it is filled with filter material it may filter out certain wavelengths of electromagnetic radiation.

In one example the pump 304 fills the filter chamber 108 to around atmospheric pressure. In another example, the pump 304 may fill the filter chamber 108 to above atmospheric pressure.

The nature of the filter material may be chosen, or be designed, based on the filtering characteristics desired. For example, it is known that different gases absorb different portions of the electromagnetic spectrum and have a known absorption fingerprint. For example, carbon dioxide absorbs radiation having a wavelength of around 4.26 microns, carbon monoxide absorbs radiation having a wavelength of around 4.7 microns, and methane absorbs radiation having a wavelength of around 3.4. Depending on the desired filtering characteristics a suitable filter material may be produced, for example, from one or multiple gases or fluids. In one example a filter material may comprise a colored filter material, for example to filter out portions of the visual light spectrum.

Figure 4:
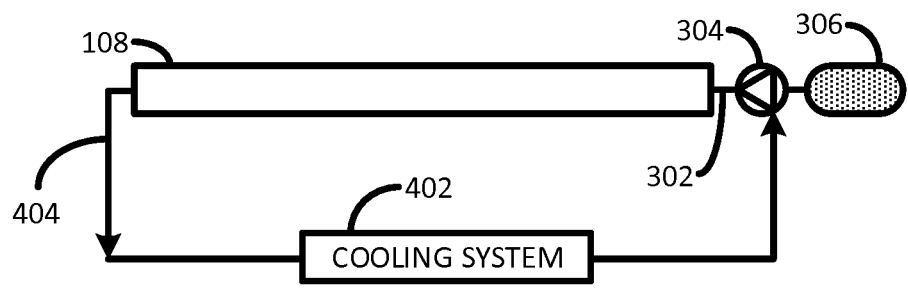
FIG. 4 is an illustration of a controllable filter chamber according to one example.

Depending on the amount of energy emitted by the radiation source 102 and the absorption properties of the filter material, the filter material may heat up. Again, depending on the characteristics of the filter material it may be beneficial to keep the filter material within a predetermined temperature range. This may help prevent, for example, the filter material from emitting radiation at undesired frequencies as a result of the filter material becoming heated. Accordingly, in FIG. 4 is shown an example filter system that incorporates a filter material cooling system 402. In this example, filter material flows through a conduit 404 located at one extremity of the filter chamber 108, through the cooling system 402, and back to the pump 304, where it is recirculated within the filter chamber 108. The cooling system 402 may be any suitable cooling system, such as a free-air cooling system, for example, using heat-exchangers, heat sinks, heat-pipes or the like. In another example the cooling system 402 may be a mechanical cooling system, such as a mechanical refrigeration system.

In other examples a housing cooling system (not shown), such as an air refrigeration system, may be used to cool the air within the housing 106, such that the lamp 102 and filter chamber 108 are indirectly cooled. Such a housing cooling system may, in one example be used in addition to a filter material cooling system. In another example a housing cooling system may be used instead of a filter material cooling system.

Figure 5:
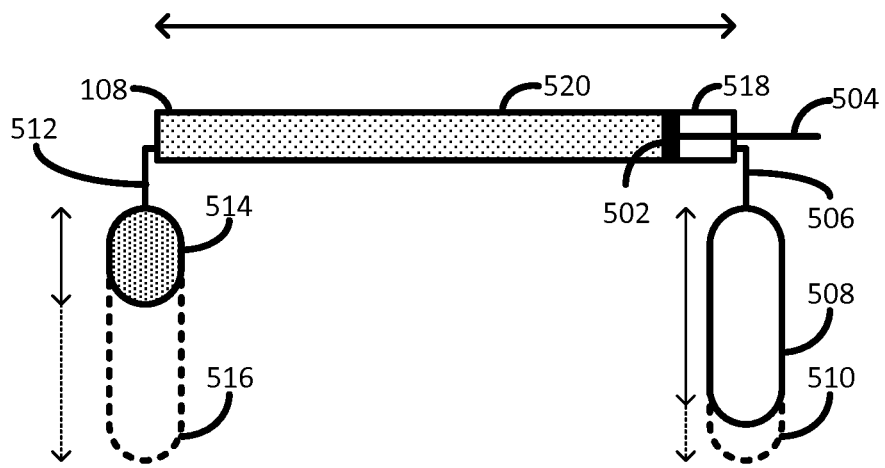
FIG. 5 is an illustration of a controllable filter chamber according to one example.

A further example of a controllable filter chamber 108 is shown in FIG. 5. In this example a piston 502 is incorporated within the chamber 108. The head of the piston forms an airtight seal with the interior surface of the chamber 108. The piston head may be moved by a plunger 504 that may be controllably driven by, for example, a motor. At one end of the chamber, a conduit 506 fluidly connects the end of the chamber with a first expansible fluid store 508. In one example, the first fluid store 508 may store a first filter material, such as air. In another example the first fluid store may store a first filter material other than air. At the other end of the chamber 108 a conduit 512 fluidly connects the end of the chamber with a second expansible fluid store 514. The second fluid store 514 may store a second filter material, such as carbon dioxide, depending on the particular filter characteristics desired.

The piston 502 is movable along the interior length of the chamber 108 such that, when the piston 502 is at one extremity, the chamber 108 is filled with one of the filter materials, and when the piston is at the other extremity, the chamber 108 is filled with the other one of the filter materials. FIG. 5 illustrates the piston 502 being in a position close to the right-hand extremity of the chamber 108, such that a first portion 518 of the chamber 108 is filled with filter material from fluid store 508, and such that a second portion 520 of the chamber 108 is filled with filter from fluid store 514.

Each fluid store is expansible to enable it to expand and contract depending on the position of the piston head 502. For example, when the piston head is at the right-hand extremity of the chamber 108, the fluid store 514 will be in its fully contracted position, whereas the fluid store 508 will be in its fully expanded position 510. In one example the fluid stores may be in the form of a rubber bladder, or other suitable expansible/contractible form.

Figure 6:
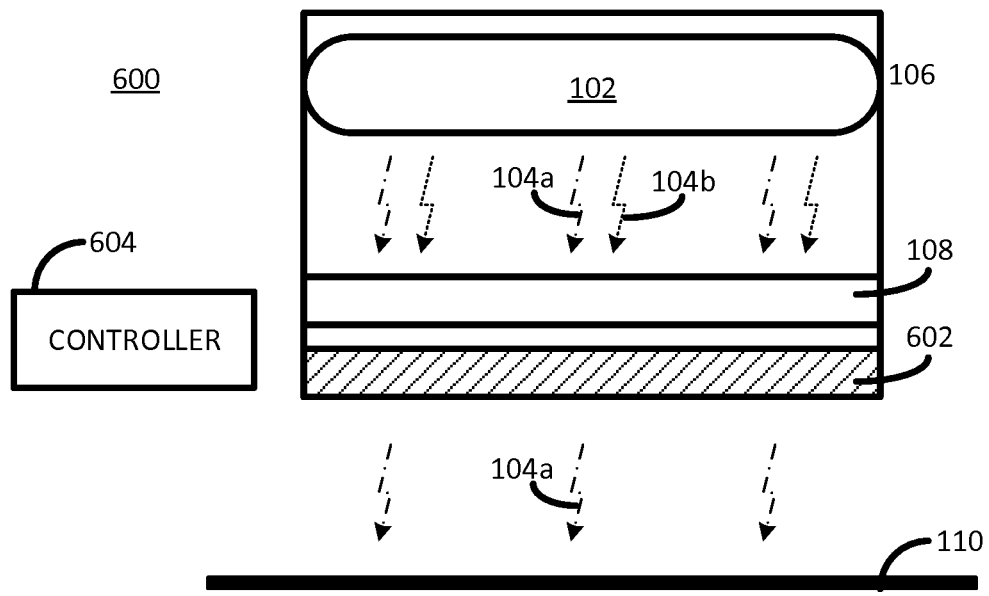
FIG. 6 is an illustration of a filtering system according to one example.

In addition to being able to selective control the filter characteristics of a single filter chamber, in a further example, multiple independently controllable filter chambers 108 and 602 may be provided such that radiation from a radiation source passes through each of the filter chambers in series, as illustrated in FIG. 6. For example, under control from the controller 604, the first filter chamber 108 may be filled with a first filter material and the second filter chamber 602 may be emptied, such that radiation having the first range of wavelengths 104*a* is blocked from reaching the target 110 (similar to as illustrated in FIG. 2). The controller 604 may then control the first filter chamber 108 to empty, and the second filter chamber 602 to be filled with a second filter material, such that only radiation having the second range of wavelengths 104*b* are blocked from reaching the target 110, as illustrated in FIG. 6.

Depending on the characteristics of the filter materials and the desired filtering characteristics, the controller could also control both filter chambers 108 and 602 to empty, and could also control both filter chambers 108 and 602 to fill with their associated filter materials.

Furthermore, although FIG. 6 illustrates a pair of filter chambers, in other examples more than two filter chambers may be provided with each having an associated filter material and respective filtering properties.

Although illustrated in the accompanying drawings in side view, a filter chamber may be of any suitable form, such as cylindrical, cuboidal, or the like. In one example the filter chamber may have a height of around 1 cm, although in other examples a greater or lower height may be used.

Figure 7:
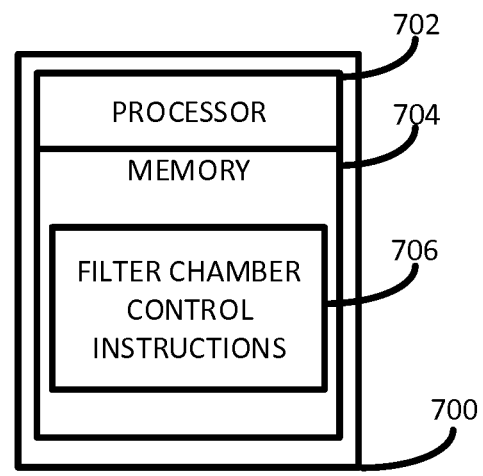
FIG. 7 is a block diagram of a filtering system controller according to one example.

Referring now to FIG. 7, there is shown a filter controller 700, such as the filter controller 112 or 602, in greater detail. The controller 700 comprises a processor 702, such as a microprocessor or microcontroller. The processor 702 is in communication, through a suitable communication bus (not shown), with a memory 704. The memory 704 stores processor understandable filter chamber control instructions 706 that, when executed by the processor, cause the processor to control one or multiple filter chambers, as described herein.

Figure 8:
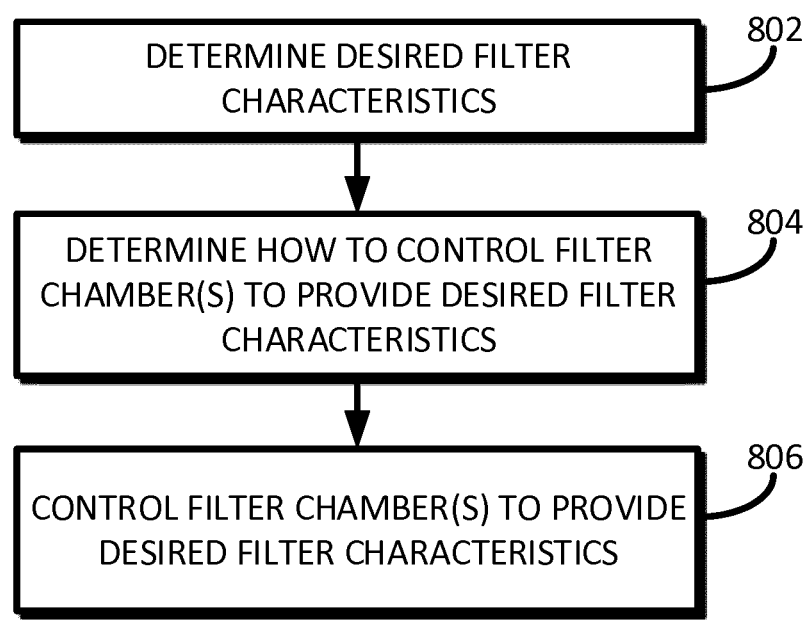
FIG. 8 is a flow diagram outlining a method of operating a filtering system according to one example.

An example method of operating such a filtering system is outlined in the flow diagram of FIG. 8. At block 802, the controller 700 determines a set of desired filter characteristics. For example, this information may be input by a user, through a suitable user interface, or may be communicated to the controller 700 by an electronic interface of a further processing system (not shown). For example, the set of desired filter characteristics may define one or multiple sets of electromagnetic frequencies that are to be filtered to prevent, or substantially reduce the intensity of, radiation of these frequencies from reaching the target zone 110.

At block 804 the controller 700 determines how to provide the desired filter characteristics using the available filter chambers and their associated filter characteristics. For example, the controller 700 may determine which (if any) of the available filter chambers to empty, and which (if any) of the available filter chambers should be filled with their associated filter materials based to provide the desired filter characteristics. Depending on the desired filter characteristics and the filtering properties of the or each filtering chamber it may not be possible to provide exactly the desired filter characteristics using the available filter chambers, in which case the controller 700 may determine how to provide acceptable filtering properties. In one example, if the controller 700 is unable to control the available filter chambers to provide an acceptable set of filtering properties it may send an appropriate signal, trigger an alarm, display a suitable message, or the like.

In one example the memory 704 may store lookup table data, for example describing the filter characteristics of each available filter chamber.

At block 806, the controller 700 controls the appropriate ones of the available filter chambers to provide the desired filter characteristics.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. An electromagnetic radiation filtering system, comprising:
   an electromagnetic radiation source to provide electromagnetic radiation to a target zone;
   a filter chamber through which the electromagnetic radiation is to pass before arriving at the target zone;
   a filter chamber control system to selectively modify the contents of the filter chamber to modify the wavelengths of radiation that pass through the filter chamber; and a pump which is connected to the filter chamber and a filter material store, wherein the pump is controllable to either fill the filter chamber with filter material from the filter material store or to empty the contents of the filter chamber into the filter material store.

2. The system of claim 1, wherein the filter chamber control system is selectively controllable to fill the filter chamber with a filter material, the filter material having predetermined filtering characteristics.

3. The system of claim 2, wherein the filter chamber control system is selectively controllable to remove the filter material from the filter chamber.

4. The system of claim 2, wherein the filter material is one of: a gas; and a liquid.

5. The system of claim 1, comprising a plurality of filter chambers through which radiation from the radiation source can pass through to the target zone, where each filter chamber is associated with a different filter material having predetermined filtering characteristics.

6. The system of claim 5, wherein each filter chamber is selectively controllable to be independently filled or emptied of its associated filter material.

7. The system of claim 1, further comprising a controller to:
   determine filtering characteristics to be provided by the filtering system; determine how to control the filter chamber to provide the filter characteristics; and control the filter chamber to provide the filter characteristics.

8. The system of claim 1, wherein the pump is controllable to either fill the filter chamber with filter material from the filter material store or to empty the contents of the filter chamber into the filter material store in less than 10 seconds.

9. The system of claim 1, further comprising a filter material cooling system to cool filter material in the filter chamber such that the filter material is kept within a predetermined temperature range.

10. The system of claim 1, wherein the filter chamber is fluidly connected, at one extremity of the filter chamber, to a first filter material store, and is fluidly connected, at the opposite extremity of the filter chamber, to a second filter material store, and wherein within the filter chamber is disposed a piston head having an airtight seal with the interior of the filter chamber, such that when the piston head is positioned at one extremity of the filter chamber the filter chamber is filled with filter material from one of the filter material stores, and when positioned at the opposite extremity the filter chamber is filled with filter material from the other one of the filter material stores.

11. The system of claim 1, wherein the filter chamber is formed of a material that is substantially transparent to at least a portion of the spectrum of radiation emitted by the radiation source.

12. A method of controlling an electromagnetic filtering system comprising a controllable filter chamber controlled to selectively be filled with a filter material, comprising:
   determining filtering characteristics to be provided by the filtering system;
   determining whether the filter chamber should be filled with the filter material;
   controlling the filter chamber to be filled as determined; and
   providing cooling so that the filter material is kept within a predetermined temperature range when in the filter chamber.

13. The method of claim 12, wherein the filtering system comprises multiple filter chambers, each associated with a different filter material having predetermined filter characteristics, the method further comprising:
   determining, based on the determined filter characteristics, which of the filter chambers should be filled with their associated filter material; and
   controlling the appropriate ones of the filter chambers to be filled with their associated filter material.

14. The method of claim 13, further comprising:
   determining, based on the determined filter characteristics, which of the filter chambers should be emptied of their associated filter material; and
   controlling the appropriate ones of the filter chambers to be emptied of their associated filter material.

15. An electromagnetic radiation filtering system, comprising:

an electromagnetic radiation source to provide electromagnetic radiation to a target zone;
a filter chamber through which the electromagnetic radiation is to pass before arriving at the target zone; and
a filter chamber control system to selectively modify the contents of the filter chamber to modify the wavelengths of radiation that pass through the filter chamber; and a controller to:
receiving input specifying filtering characteristics for the filtering system;
determine how to control the filter chamber to provide the specified filter characteristics; and
control the filter chamber control system to provide the specified filter characteristics;
wherein the filter chamber is fluidly connected, at one extremity of the filter chamber, to a first filter material store, and is fluidly connected, at the opposite extremity of the filter chamber, to a second filter material store, and wherein a piston head is moveably disposed within the filter chamber, the piston head having an airtight seal with an interior of the filter chamber, such that, when the piston head is positioned at one extremity of the filter chamber, the filter chamber is filled with filter material from one of the filter material stores, and, when positioned at the opposite extremity, the filter chamber is filled with filter material from the other one of the filter material stores.

16. The method of claim 12, further comprising circulating the filter material through a cooling system external to the filter chamber.

17. The method of claim 12, further comprising cooling gasses within the filter chamber.

18. The system of claim 15, wherein each of the filter material stores expands in volume to receive filter material and contracts in volume when providing filter material in to the filter chamber.

19. The system of claim 1, further comprising:
an additional filter chamber connected to a store of different filter material;
a controller to pump the different filter material into and out of the additional filter chamber;
the filter chamber and the additional filter chamber being arranged in series to serially filter the electromagnetic radiation from the radiation source being passed to the target zone.

20. The system of claim 19, wherein the filter material filters a different band of wavelengths from the electromagnetic radiation than does the different filter material.

* * * * *